(No Model.)
A. S. FONDA.
CLOTHES LINE REEL.
No. 524,167. Patented Aug. 7, 1894.
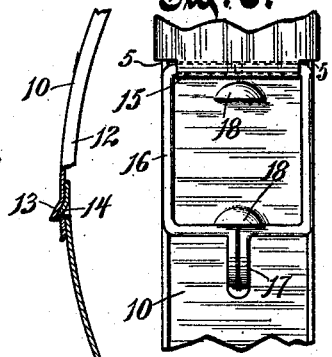
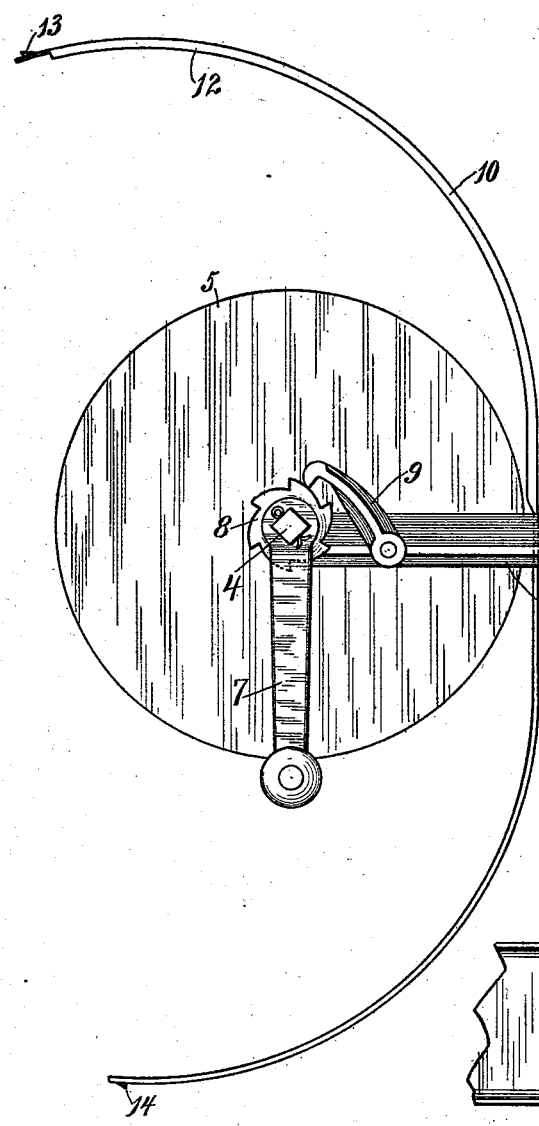
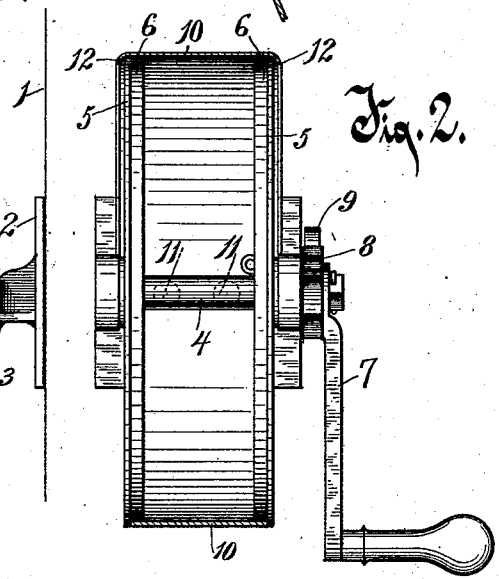
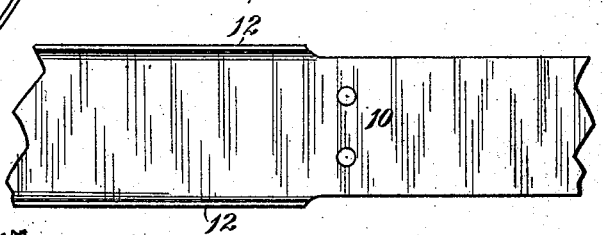
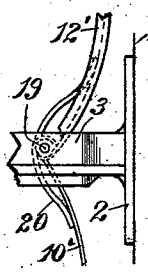
Witnesses.
O. N. Keney.
Anna V. Faust.
Inventor.
Arthur S. Fonda,
By Benedict & Morsell
Attorneys.
THE NORRIS PETERS CO., PHOTO-LITHO., WASHINGTON, D. C.

UNITED STATES PATENT OFFICE.

ARTHUR S. FONDA, OF WHITEWATER, WISCONSIN.

CLOTHES-LINE REEL.

SPECIFICATION forming part of Letters Patent No. 524,167, dated August 7, 1894.

Application filed February 21, 1894. Serial No. 500,985. (No model.)

*To all whom it may concern:*

Be it known that I, ARTHUR S. FONDA, of Whitewater, in the county of Walworth and State of Wisconsin, have invented a new and useful Improvement in Clothes-Line Reels, of which the following is a description, reference being had to the accompanying drawings, which are a part of this specification.

My invention has relation to improvements in clothes line reels.

The primary object of the invention is to provide a construction adapted to thoroughly protect the line from the effects of wet weather or dampness, when said line is wound in upon the shaft.

With the above object, and others, in view, the invention consists in the devices and parts, or their equivalents, as hereinafter more fully described and claimed.

In the accompanying drawings, Figure 1, is a side elevation of the reel showing the cover open. Fig. 2, is an edge view, at right angles to Fig. 1, the cover being in section. Fig. 3, is a front view of a fragment of the cover. Fig. 4, is a fragmentary partially sectional view of the ends of the cover, showing the form of catch illustrated in Fig. 1. Fig. 5, is a detail showing a modification in the construction of the cover, and Fig. 6, is a fragment of opposite ends of the cover, showing a modified and the preferred form of catch.

Like numerals of reference denote like parts throughout the several views.

Referring to the drawings, the numeral 1 indicates an upright support or beam, to which is secured a plate 2, having formed integral therewith, and projecting forward therefrom, arms 3, 3, the outer ends of which form bearings for a transverse shaft 4, upon which shaft the clothes line is wound and unwound. This shaft has mounted rigidly thereon, near opposite ends, side disks 5, 5, each disk having projecting laterally from its inner face, near the periphery thereof, an annular shoulder 6. Upon one of the projecting ends of the transverse shaft 4 is secured a crank 7, which crank is provided with an integral ratchet wheel 8.

Pivoted to one of the side arms 3 is a pawl or dog 9, the free end of which is adapted to engage with the teeth of the ratchet wheel, whereby the reel is held at any position to which it may be turned.

The numeral 10 indicates the cover illustrated clearly in Fig. 1. This cover is secured about centrally to the transverse arm which connects the two outwardly extending arms 3, 3, by rivets 11, 11. The upper portion of the cover is provided with depending flanges 12, 12 which overlap the outer faces of the side disks, while the lower portion of the cover is unprovided with these flanges, and fits neatly within the side disks, and against the annular shoulders 6, 6, as clearly shown in Fig. 2. In Fig. 3 is shown a detail fragmentary view of the cover, clearly showing the flanged and unflanged portions thereof.

In Fig. 4 is shown on an enlarged scale the form of catch illustrated in Fig. 1. This catch consists of an under depression 13 at the end of the upper portion or the cover, and a corresponding offset or shoulder 14 at the end of the under portion of the cover, which offset or shoulder, when the cover is drawn around the reel so as to close the same, will engage the depression and hold the cover closed. In Fig. 6, however, is shown the preferred form of catch. In the construction shown in this figure the upper portion of the cover is provided with a terminal transverse eye 15, in which one end of a rectangular loop 16 is free to turn. The opposite end of this loop is provided with a medially out-turned finger piece 17, which provides for the ready turning of the loop in its pivot eye. At different points near the end of the under portion of the cover are provided two lugs or projections 18, 18. When the free end of the loop is in engagement with the innermost lug or projection, the cover is held closed. When the loop is released, the cover is permitted to spring apart, and the loop is then made to engage with the outermost lug or projection, whereby the ends of the cover are held a convenient distance apart to permit of the free winding and unwinding of the line.

In Fig. 5 is illustrated a modification in the arrangement of the cover, in which said cover is composed of two semi-cylindrical sections. This modified form of cover I designate by the numeral 10', and its side flanges by the numeral 12'. The inner ends of the sections are hinged upon a transverse rod 19 having its ends supported by the forward-extending arms 3, 3. Encircling the rod 19 is a coiled spring 20, said spring having its opposite ends bearing upon the respective sections of the cover, and holding said sections in their open position, when the catch at the forward end of the cover is released.

In operation, when it is desired to unwind the line, the cover is unlocked, which will permit the ends thereof to spring apart a sufficient distance to permit of the free unwinding of the line, and its suitable attachment a distance from the reel. The reel can then be rotated in the opposite direction, which will have the effect of drawing the line taut. When the line is drawn sufficiently taut, the dog or pawl 9 is thrown into engagement with the ratchet wheel 8. When it is desired to wind the line in upon the reel, the latter is, by means of the crank 7, of course rotated in a direction opposite to that required for unwinding. As the side disks 5, 5, are mounted rigidly on the transverse shaft 4, very little friction, and consequently a very slight amount of wear on the rope, in winding and unwinding is encountered. After the line is fully wound in, the cover is brought around the reel so as to completely close the same, said cover being secured in this position by means of the catch. When the cover is thus closed, it will be seen that the side flanges 12, 12 of the upper portion will overlap the edges of the side disks 5, 5, while the under portion of the cover will fit between the side disks 5, 5, and against the annular shoulders 6, 6. In this manner a tight closure of the reel is secured, the depending flanges 12, 12, effectually preventing rain or water from passing into the interior of the reel.

Having thus described my invention, what I claim, and desire to secure by Letters Patent, is—

1. In a clothes line reel, the combination, with a reel composed of a rotatable shaft and side disks carried by the shaft, said disks having interior annular shoulders, of a cover having its upper portion provided with depending flanges overlapping the outer sides of the disks, and its lower portion fitting between said disks and bearing against the shoulders thereof, when the cover is in a closed position around the disks, the ends of said cover also provided with a suitable catch to hold the cover in closed position, substantially as set forth.

2. In a clothes line reel, the combination, of forward-extending arms, a transverse shaft journaled in said arms, side disks carried by the shaft, a transverse rod having its ends mounted in the forward-extending arms, a cover composed of two semi-cylindrical sections turning on the rod, and a coiled spring encircling the rod, the free ends of said spring bearing against the respective sections of the cover, substantially as set forth.

3. In a clothes line reel, the combination, of a reel composed of a rotatable shaft, and side disks carried by the shaft, a cover adapted to fit around the disks for closing the reel, one end of said cover provided with lugs or projections, and a loop pivoted at the other end of the cover, said loop adapted to engage the innermost lug when the cover is closed, and to be thrown into engagement with the outermost lug when the cover is opened, substantially as set forth.

In testimony whereof I affix my signature in presence of two witnesses.

ARTHUR S. FONDA.

Witnesses:
ELMER E. FONDA,
HOBERT O. WEEKS.